(12) United States Patent
Hsu et al.

(10) Patent No.: US 8,195,724 B2
(45) Date of Patent: Jun. 5, 2012

(54) PROVIDING A VIRTUAL BINDING FOR A WORM STORAGE SYSTEM ON REWRITABLE MEDIA

(75) Inventors: Windsor Wee Sun Hsu, San Jose, CA (US); Lan Huang, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 65 days.

(21) Appl. No.: 12/781,021

(22) Filed: May 17, 2010

(65) Prior Publication Data

US 2010/0223665 A1  Sep. 2, 2010

Related U.S. Application Data (62) Division of application No. 11/244,269, filed on Oct. 5, 2005, now Pat. No. 7,747,661.

(51) Int. Cl.
G06F 17/30 (2006.01)
G06F 17/00 (2006.01)
(52) U.S. Cl. ......... 707/822; 707/821; 707/823; 711/112
(58) Field of Classification Search .......... 707/821–831; 711/100, 111, 112, 163, 145; 713/194
See application file for complete search history.

(56) References Cited

U.S. PATENT DOCUMENTS

| | | | |
|---|---|---|---|
| 5,535,188 A | 7/1996 | Dang et al. | |
| 5,553,019 A | 9/1996 | Sandvos et al. | |
| 6,185,661 B1 * | 2/2001 | Ofek et al. | 711/145 |
| 6,339,810 B1 | 1/2002 | Basham et al. | |
| 6,615,330 B2 | 9/2003 | Debiez et al. | |
| 6,724,554 B1 | 4/2004 | Braithwaite et al. | |
| 6,744,713 B1 | 6/2004 | Ko et al. | |
| 6,775,703 B1 | 8/2004 | Burns et al. | |
| 6,779,080 B2 | 8/2004 | Basham et al. | |
| 7,139,891 B1 | 11/2006 | Apvrille et al. | |
| 7,155,460 B2 | 12/2006 | McGovern et al. | |
| 7,222,215 B2 * | 5/2007 | Sonoda et al. | 711/112 |
| 7,346,599 B2 * | 3/2008 | Ogawa et al. | 726/2 |
| 7,418,596 B1 | 8/2008 | Carroll et al. | |
| 7,441,075 B2 | 10/2008 | Evans et al. | |
| 7,506,178 B2 * | 3/2009 | Jaquette et al. | 713/194 |
| 2003/0126446 A1 | 7/2003 | Debiez et al. | |
| 2003/0163718 A1 | 8/2003 | Johnson et al. | |
| 2005/0050342 A1 | 3/2005 | Boivie et al. | |

OTHER PUBLICATIONS

Santry et al., "Deciding when to forget in the Elephant file system," pp. 110-123, ACM 1999.
Cox, et al. "Pastiche: Making Backup Cheap and Easy," USENIX Association, 5th Symposium on Operating Systems Design and Implementation, pp. 285-298, 2002.
USPS Electronic Postmark (USPS EPM (R)), White Paper, 2003.

(Continued)

*Primary Examiner* — Yicun Wu
(74) *Attorney, Agent, or Firm* — Shimokaji & Assoc., PC (57) ABSTRACT

A virtual binding system ensures that the WORM logic for protecting data immutability cannot be circumvented, effectively guaranteeing WORM property of a WORM storage system composed of rewritable magnetic hard disks. To close the security hole between the rewritable media and the WORM logic, virtual binding securely authenticates the legitimacy of a WORM logic controller before granting data access on a WORM storage media. Furthermore, the system verifies the legitimacy of the WORM logic controller during data access. This approach virtually binds together the WORM logic controller and the WORM storage media even though the WORM logic controller and the WORM storage media may be physically separate.

1 Claim, 9 Drawing Sheets

OTHER PUBLICATIONS

"CrytoCards—IBM eServer Cryptographic Hardware Products," downloaded from the WorldWideWeb at URL:http://www.ibm.com/security/cryptocards, on Jul. 20, 2005.

"IBM PCI Cryptographic Coprocessor," downloaded from the WorldWideWeb at URL:http://www.ibm.com/security/cryptocards/pcicc.shtml, on Jul. 20, 2005.

* cited by examiner

PROVIDING A VIRTUAL BINDING FOR A WORM STORAGE SYSTEM ON REWRITABLE MEDIA

FIELD OF THE INVENTION

The present invention generally relates to write-once read-many (WORM) storage and in particular to a WORM storage system utilizing rewriteable media.

BACKGROUND OF THE INVENTION

As critical data are increasingly stored in electronic form, it is imperative that the critical data be stored reliably in a tamper-proof manner. Furthermore, a growing subset of electronic data (e.g., electronic mail, instant messages, drug development logs, medical records, etc.) is subject to regulations governing long-term retention and availability of the data. Recent high-profiled accountability issues at large public companies have further caused regulatory bodies such as the Securities and Exchange Commission (SEC) to tighten their regulations. For instance, Securities Exchange Commission Rule 17a-4, which went into effect in May 2003, specifies storage requirements for email, attachments, memos, and instant messaging as well as routine phone conversations.

A requirement in many such regulations is that data must be stored reliably in non-erasable, non-rewritable storage such that the data, once written, cannot be altered or overwritten. Such storage is commonly referred to as WORM (Write-Once Read-Many) storage as opposed to WMRM (Write-Many Read-Many) storage, which can be written many times.

Conventional WORM storage media comprises WORM tape, ablative WORM optical disk, and magnetic WORM disk. For ablative WORM-based optical CD, the non-overwritable property is inherent in the physical media. Although conventional WORM technology has proven to be useful, it would be desirable to present additional improvements. Writing data to ablative WORM optical disk invokes a permanent change to media itself and cannot be reversed. However, for existing tape-based and magnetic hard-disk based WORM storage system, the media is rewriteable and the WORM property is guaranteed in microcode rather than by media itself.

Guaranteeing the WORM property in microcode rather than by the media introduces a potential trust problem. The data stored on the rewritable media can be modified by malicious applications through another I/O interface that does not support WORM-safe microcode. Conventional rewritable media has no means of protection to prevent data from being overwritten. Once the rewritable media is disconnected from the media drive (disk controller or tape drive) that implements the WORM feature, the data on the media can be overwritten by non-WORM tape drives or disk controllers.

The use of rewritable media as WORM storage is attractive because the random access performance of magnetic hard disks is orders of magnitude improved over that of optical WORM disks. In practice, the fast read performance of rewritable magnetic disks is desirable to meet the search requirement of the current data regulations. One conventional approach to providing WORM storage with rewritable media is to lock the whole storage enclosure (disks, WORM controllers) physically together to avoid tampering. This approach protects the rewritable media from being altered by intruding non-WORM controllers. However, a super key can easily tamper a physical lock. This approach further imposes difficulties and overhead on storage management.

WORM properties of a storage system can be guaranteed on a software level, a firmware level, or a media level. Implementing a WORM property at the media level (e.g., inside hard drives) requires significant changes to the existing commodity hardware. Data storage and access regulations are continually changing, requiring flexibility in configuring WORM storage. The overhead of altering any logic in hardware is usually larger than that of upgrading microcode or software. However, conventional rewritable storage such as a hard drive typically does not provide a programmable environment. Consequently, a WORM storage based on customized hard drives may be unable to meet changes in data regulations.

Implementing a WORM property in a programmable level such as that of a firmware level or software level provides the flexibility required to comply with continually changing data regulations. However, once the binding of the media and the WORM logic is implemented in the firmware level or the software level, the media content can be easily altered.

One conventional approach uses a physical lock on an enclosure in which the components of the WORM storage system reside. The physical lock ensures that the rewritable hard drives and the WORM logic implemented in a storage controller or a processor are physically bound together. Consequently, a malicious adversary has no opportunity to tamper the hard disks through a non-WORM storage controller. However, the anti-tampering barrier of a physical lock is low. For example, an intruder can use a super key to open the locked enclosure. Another conventional approach uses magnetic latches to lock the rewritable disks into an enclosure together with the WORM logic. Such physical binding, however, requires extensive changes to current systems and limits incremental growth.

Another conventional approach uses password verifications to bind the WORM logic with the rewritable storage. This approach requires no hardware modifications. Certain commodity hard drives already have built-in hard-drive password protection. However, authentication passwords can be easily tampered. The following is a scenario describing how an intruder tampers a password-based authentication. Assume the WORM logic is implemented in the firmware of a disk controller. Suppose a controller and disk pair comprises a controller $C_0$ and a disk $D_0$. A malicious controller and disk pair comprises a malicious controller $C_1$ and a malicious disk $D_1$.

The controller $C_0$ and disk $D_0$ operate in an open, accessible environment or cabinet such that disks can be freely plugged in and out. The intruder removes the disk $D_0$ from the cabinet. The intruder inserts the malicious disk $D_1$ to steal the password of the controller $C_0$. Once disk $D_1$ has this password, the disk $D_1$ passes it the password to malicious controller $C_1$. Now the intruder can use this password to authenticate malicious controller $C_1$ with disk $D_0$ and alter the data on disk $D_0$.

To comply with continually changing regulations for data storage and use rewritable media as WORM data storage, data management systems require a configuration that maximizes performance, flexibility, and growth capability. A secure binding of WORM logic and storage media is desired to achieve true data immutability without sacrificing ease of storage management tasks such as failure recovery, etc. What is therefore needed is a system, a computer program product, and an associated method for providing a virtual binding for a WORM storage system on rewritable media. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for providing a virtual binding for a WORM storage system on rewritable media. The virtual binding ensures that WORM logic protecting data immutability cannot be circumvented.

The present system comprises a WORM logic controller and a WORM storage module. The WORM storage module resides in a storage enclosure with a rewritable media. The WORM logic of the WORM logic controller can be implemented in any form such as, for example, application software, file system software, or firmware of a storage controller. As a WORM logic controller, the WORM logic is realized in a programmable storage controller to avoid hardware modifications to the rewritable media of the WORM storage module.

To close any security holes between the WORM storage module and the WORM logic controller, a controller authenticator of the WORM storage module securely authenticates legitimacy of the WORM logic controller before granting data access to the rewritable media. Similarly, a storage authenticator of the WORM logic controller authenticates the WORM storage module. The present system virtually binds the WORM logic controller and the WORM storage module together even though the WORM logic controller and the WORM storage module may be physically separated. Consequently, the present system enables storage media mobility and allows easy and secure information transfer in an open and malicious environment. The present system further enables flexible system capacity scaling and ease of storage management.

The WORM logic controller and the WORM storage module each comprise a public key and a private key. The WORM logic controller and the WORM storage module mutually register using their respective public key. The registered public key of the WORM logic controller is stored in a storage user table in the controller authenticator on the WORM storage module. The registered public key of the WORM storage module is stored in a controller user table in the storage authenticator on the WORM logic controller. The WORM storage module grants media access rights only to a legitimate WORM logic controller authenticated by the controller authenticator. This authentication requirement prevents overwriting of data in a malicious attack.

A WORM storage module that is blank and comprising an empty user table admits any WORM logic controller. A WORM storage module with user table that is not empty admits WORM logic controllers only until an associated registration phase closes.

The virtual binding of the present system is provided through secure authentication. During the authentication phase, no secret information is transmitted for authentication. Consequently, the authentication phase of the present system is more secure than conventional password authentication. Once the registration and initialization is securely performed, only the registered controllers can access the target hard drives. To avoid hardware modifications to existing hard disks, the authentication logic is implemented on a customized and permanently sealed storage enclosure. The rewritable media is permanently locked in the sealed storage enclosure.

The present system does not rely on physical locks to bind the WORM logic controller and the WORM storage module together. The present system provides WORM protection for each WORM storage module even if the WORM storage module is disconnected from the WORM logic controller. To achieve minimum total system cost, the present system minimizes the required modifications to media hardware. Compared to WORM storage on magnetic disks using mechanical lock protection, the present system offers improved disk mobility and system scalability.

The virtual binding seamlessly ties together the WORM logic controller and WORM storage module for the rewritable media of a storage enclosure. With virtual binding, the present system achieves a secure WORM property for a WORM storage system using rewritable media. Every user for a storage enclosure is securely authenticated before any data access is allowed. The barrier for tampering is much higher for the present system than that of conventional WORM storage systems relying on a physical lock or no binding at all. The present system further achieves high system throughput and retrieval performance.

The present system achieves ease of storage management. Virtual binding does not require any physical lock or physical enclosure for security. A storage enclosure and a WORM logic controller can join or leave a storage system through a relatively simple procedure. The present system further provides flexibility in capacity scaling. Virtual binding allows addition of new storage enclosures at system run time.

The present system provides low total system cost. WORM logic is programmed in a programmable environment of the WORM logic controller. The WORM logic controller comprises a commodity storage controller or application software. Authentication logic for the controller authenticator is built in a customized storage enclosure. No hardware modification is required for the rewritable media. The present system further provides ease of function extension. WORM logic and other functions required for data compliance can be easily upgraded in a programmable environment.

The present system may be embodied in a utility program such as a virtual binding utility program. The present system also provides means for the user to identify a set of data to be stored in WORM storage provided by the present system and then invoke the virtual binding utility program to process and store the data in WORM storage.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
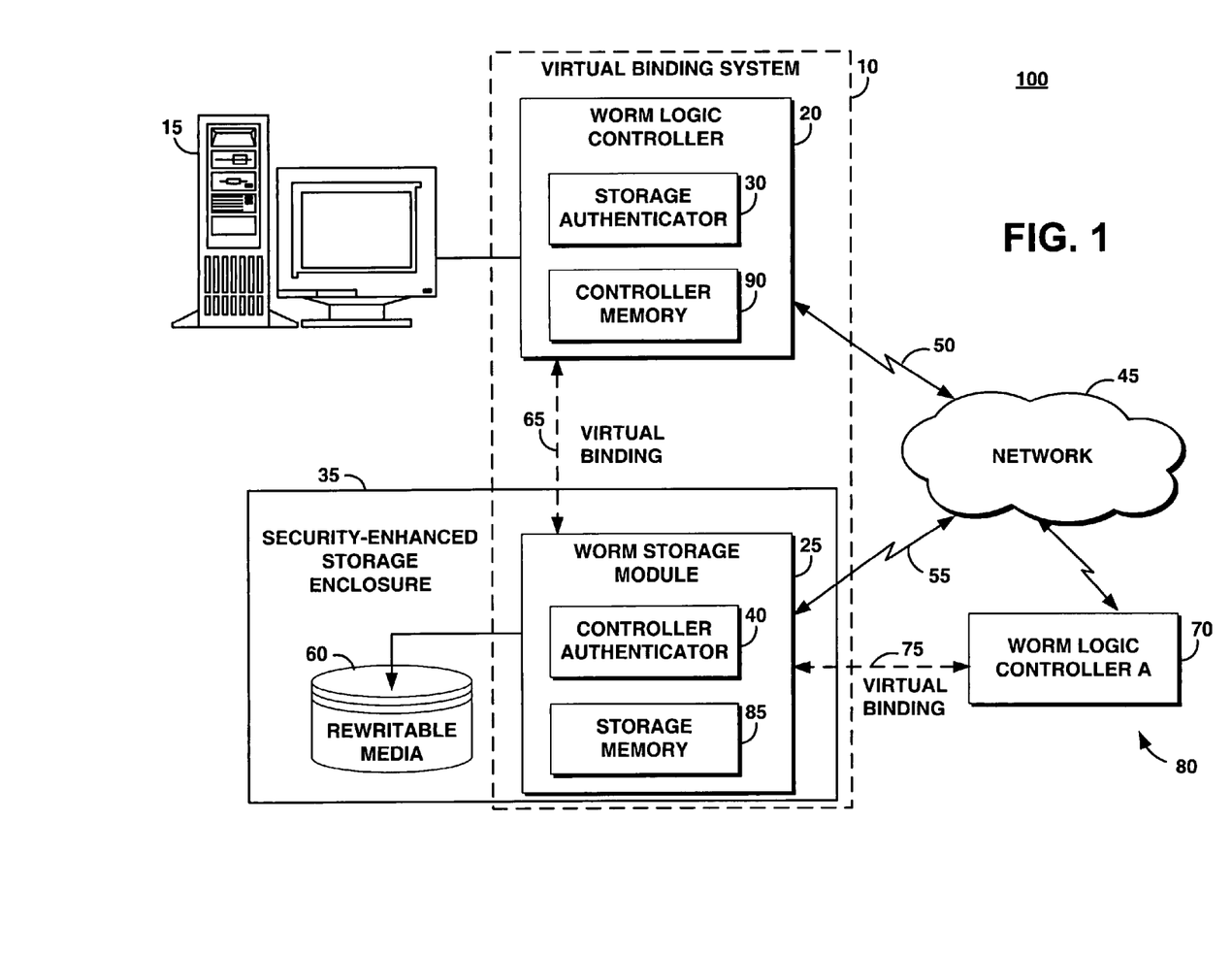
FIG. 1 is a schematic illustration of an exemplary operating environment in which a virtual binding system of the present invention can be used.

FIG. 1 portrays an exemplary overall environment (a WORM storage system 100) in which a system, a service, a computer program product, and an associated method (the "virtual binding system 10" or the "system 10") for providing a virtual binding for a WORM storage system on rewritable media according to the present invention may be used. System 10 comprises a software programming code or a computer program product that is typically embedded within, or installed on a computer 15.

System 10 comprises a worm logic controller 20 and a WORM storage module 25. The WORM logic controller 20 comprises a storage authenticator 30 for authenticating a security-enhanced storage enclosure 35. The WORM storage module 25 comprises a controller authenticator 40 for authenticating the WORM logic controller 20. The WORM logic controller 20 and the WORM storage module 25 communicate via a network 45 through communication links 50, 55, respectively. While the system 10 is described for illustration purpose only in relation to network 45, it should be clear that the WORM logic controller 20 and the WORM storage module 25 can communicate locally as well as remotely and may be co-located or located remote from each other.

The security-enhanced storage enclosure 35 (interchangeably referenced herein as storage enclosure 35) comprises the WORM storage module 25 and a rewritable media 60. The WORM storage module 25 controls access to data in the rewritable media 60, allowing only an authenticated WORM logic controller 20 to have access privileges to the rewritable media 60. Consequently, the process of authentication between the WORM storage module 25 and the WORM logic controller 20 forms a virtual binding 65 that achieves a secure WORM property for the security-enhanced storage enclosure 35.

In one embodiment, additional WORM logic controllers may have access to the rewritable media. For example, WORM logic controller A, 70, may form a virtual binding 75 through network 45. Worm logic controller A, 70, and WORM logic controller 20 are collectively referenced as WORM logic controllers 80 and represent any number of worm logic controllers. The maximum number of controllers that can be registered depends on the size of the storage memory. In practice, the storage memory size is typically large and does not pose a limitation on the number of controllers.

The rewritable media 60 comprises, for example, standard rewritable ATA or SCSI magnetic hard drives. In one embodiment, the WORM logic controller 20 comprises a built-in WORM logic controller 20. While the WORM logic controller 20 is described for illustration purposes only in terms of a built-in WORM logic controller 20, it should be clear that the WORM logic of the WORM logic controller 20 can be built in any layer. System 10 is applicable to any WORM logic implementation and storage media binding.

The WORM storage module 25 comprises a rewritable non-volatile media (a storage memory 85). In one embodiment, the storage memory 85 comprises a few hundred bytes. The storage memory 85 stores a storage public key and a storage private key (collectively referenced as the storage public/private key pair). The WORM storage module 25 further comprises the processing power required to perform public-key and private-key based encoding or decoding. While the worm storage module 25 is described for illustration purposes only as being implemented in the security-enhanced storage enclosure 35, it should be clear that the WORM storage module 25 can be implemented in the rewritable media 60.

The WORM logic controller 20 comprises a rewritable non-volatile media (a controller memory 90). In one embodiment, the controller memory 90 comprises a few hundred bytes. The controller memory 90 stores an identifier for the WORM logic controller (further referenced herein as the controller ID). The controller ID is optional, and is not necessary to maintain the controller ID. The public key could alternatively serve as the controller ID. The controller memory 90 further stores a controller public key and a controller private key (collectively referenced herein as the controller public/private key pair). The controller memory 90 stores an optional controller certificate. For ease of replication, the controller ID, the controller public/private key pair, or the optional controller certificate can be stored in persistent storage other than the controller memory 90. For example, the controller ID, the controller public/private key pair, or the optional controller certificate can be stored in a hard disk accessible only to authorized users.

When the WORM storage module 25 is implemented in the security-enhanced storage enclosure 35, the mobile granularity is a security-enhanced storage enclosure 35. The security-enhanced storage enclosure 35 is loaded with rewriteable media 60 comprising, for example, disks. The security-enhanced storage enclosure 35 is permanently sealed before being shipped. Consequently, the rewritable media 60 and the WORM storage module 25 are inseparable from the security-enhanced storage enclosure 35 and form a single entity in the WORM storage system 100.

Data access to the rewritable media 60 is locked from any attempting WORM logic controller 20 unless the authentication process of the controller authenticator 40 is successful. The controller authenticator 40 maintains a storage user table in the storage memory 85 comprising a controller public key and an optional controller ID for each of the WORM logic controllers 80 that have data access to the rewritable media 60.

The WORM storage module 25 maintains the storage private/public key pair as an identity for the WORM storage module to be authenticated by the WORM logic controller 25. In one embodiment, the WORM storage module 25 further maintains a flag to indicate a registration status. WORM logic controllers 80 can be admitted to the WORM storage module 25 only if registration is open.

In one embodiment, the WORM storage module 25 and related secret information are replicated in the security-enhanced storage enclosure 35 to avoid single point of failure. In another embodiment, the security-enhanced storage enclosure 35 is made tamper-resistant to avoid physical intrusion to the storage user table and the rewritable media 60. A tamper-resistant security-enhanced storage enclosure 35 erases any confidential information and self-destructs if any physical intrusion occurs to the security-enhanced storage enclosure.

System 10 can bind together in the virtual binding 65 the rewritable media 60 and any form of the WORM logic controller 20 (i.e., software or firmware). For fault tolerance, the WORM storage system can comprise dual WORM logic controllers 80 or additional WORM logic controllers 80. The WORM logic controller 20 is the only channel through which applications can read data on or write data to the rewritable media 60.

In one embodiment, the controller public key and the controller ID are stored in the controller certificate. The controller certificate is signed by a trusted party to prove the benevolentness of the WORM logic controller 20. The WORM logic controller 20 passes the controller certificate to any entity requiring authentication of the WORM logic controller 20.

In another embodiment, the WORM logic controller 20 is tamper-resistant to further avoid exposure of the controller public/private key pair. However, since the controller public/private key pair is kept within the WORM logic controller 20 and is not exposed to any other software or user, it is difficult to steal the controller public/private key pair from software channels. Tamper-resistance of the WORM logic controller 20 is necessary only if the probability of physical intrusion is high. In most applications of the WORM storage system 100, tamper-resistance for the WORM logic controller 20 is not required to achieve a secure virtual binding 65.

System 10 utilizes an encrypted content signature comprising a hash of data content (a content hash, for example a SHA-1 hash) to avoid traffic snooping and alternation between the WORM logic controller 20 and the rewritable media 60. The hash of the data content generates an encrypted content signature that certifies the validity of the bytes received by the rewritable media 60. Periodically, the content hash of these bytes is sent to the WORM storage module 25. The content hash is a unique encrypted content signature of the bytes that the content hash verifies. Furthermore, the content hash is encrypted using the controller private key of the WORM logic controller 20.

The WORM storage module 25 decrypts the encrypted content signature and verifies the bytes and command codes received from the WORM logic controller 20. Similarly, to defeat traffic alternation from the rewritable media 60 to the WORM logic controller 20, the WORM logic controller 20 verifies the received bytes from the rewriteable media 60. The WORM storage module 25 computes an encrypted operations signature for the results for any operations before sending the results back to the WORM logic controller 20. The encrypted operations signature is computed based on the storage private key of the WORM storage module 25. The WORM logic controller 20 trusts only those results with matching signatures.

Figure 2:
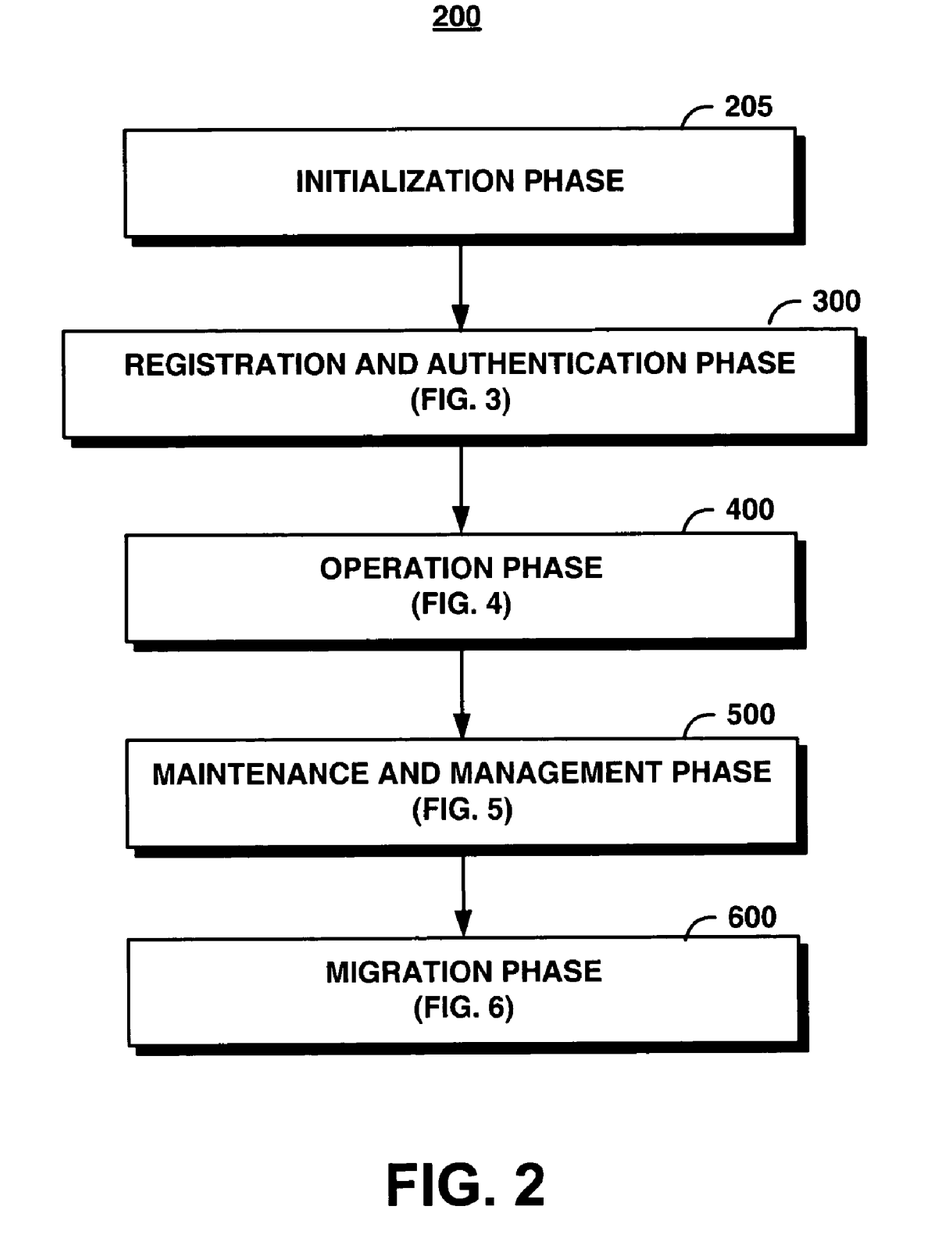
FIG. 2 is a process flow chart illustrating a method of operation of the virtual binding system of FIG. 1.

FIG. 2 illustrates a method 250 of operation of system 10. Method 250 comprises an initialization phase (step 205), a registration and authentication phase (method 300, further described in FIG. 3), an operation phase (method 400, further described in FIG. 4), a maintenance and management phase (method 500, further described in FIG. 5), and a migration phase (method 600, further described in FIG. 6).

The initialization phase (step 205) comprises initializing the WORM logic controller 20 or the security-enhanced storage enclosure 35. The security-enhanced storage enclosure 35 is shipped from the manufacturer with a storage user table that is blank and the registration flag set to "open". The WORM logic controller 20 is shipped from the manufacturer with the controller public/private key pair un-initialized. The customer initializes the controller public/private key pair when the WORM logic controller 20 is received. The manufacturer sets the controller ID to the serial number of the WORM logic controller 20.

Figure 3A:
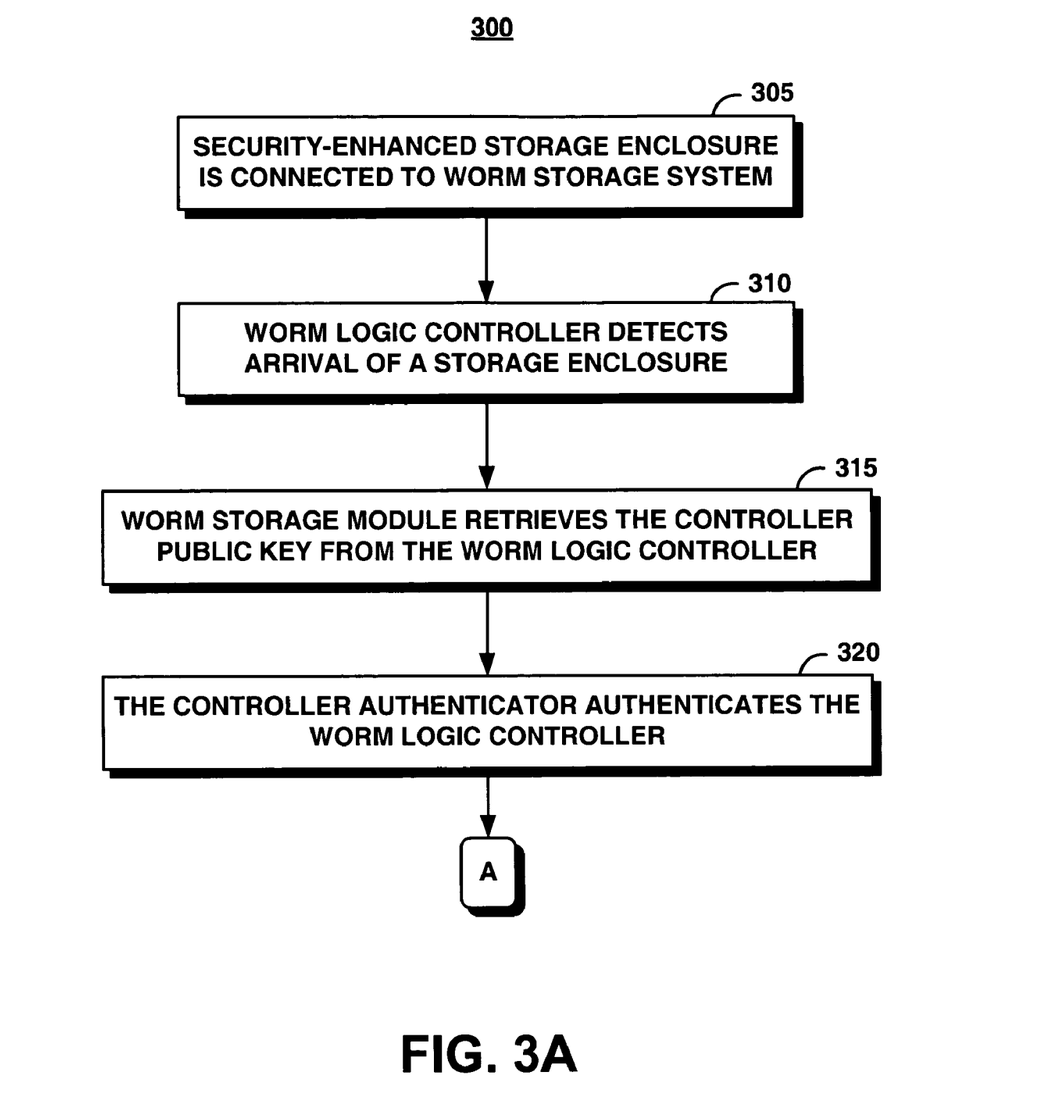
FIG. 3 comprises FIGS. 3A, 3B, and 3C, and represents a process flow chart illustrating a method of operation of the virtual binding system of FIG. 1 in a registration and authentication phase.
Figure 3B:
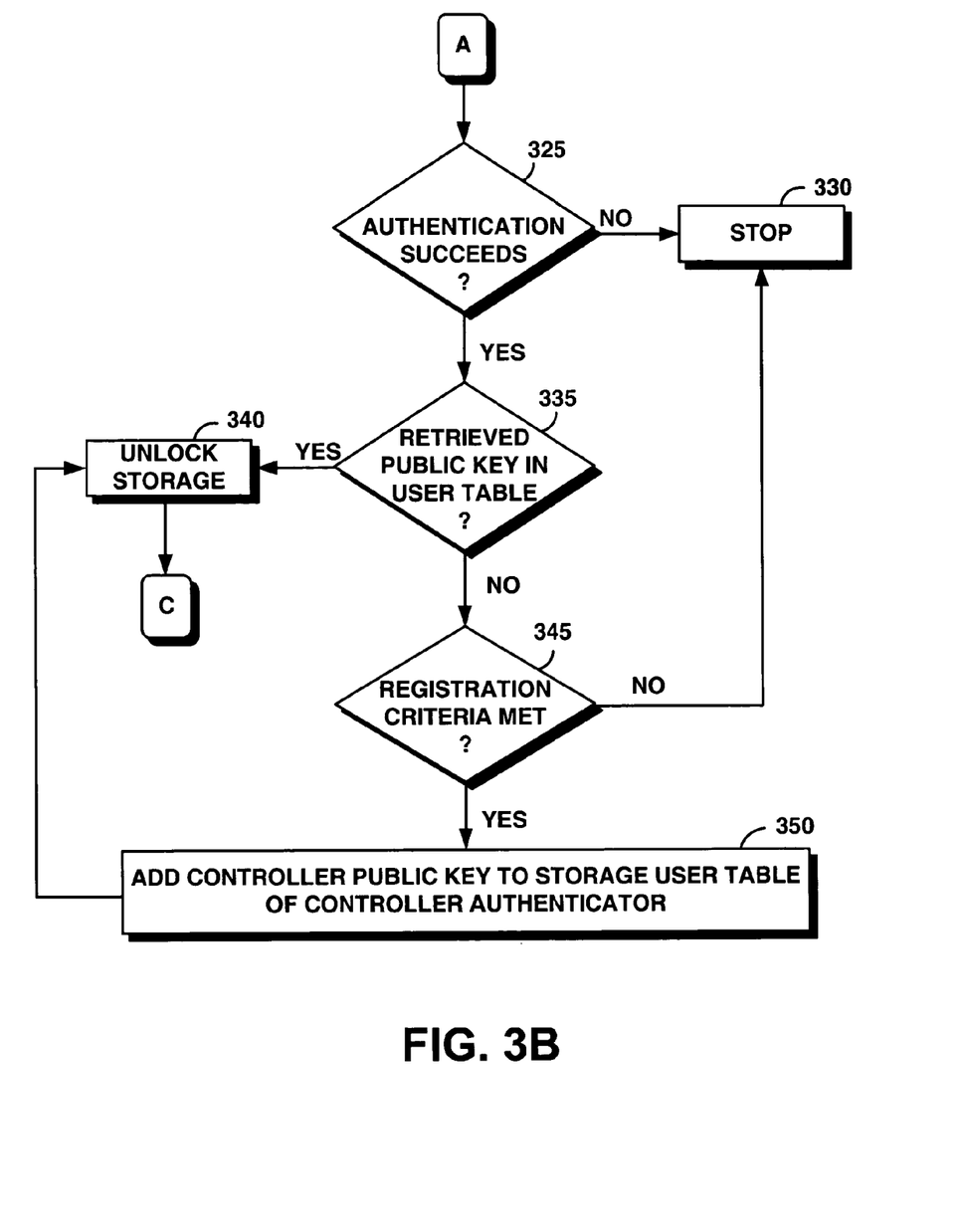
Figure 3C:
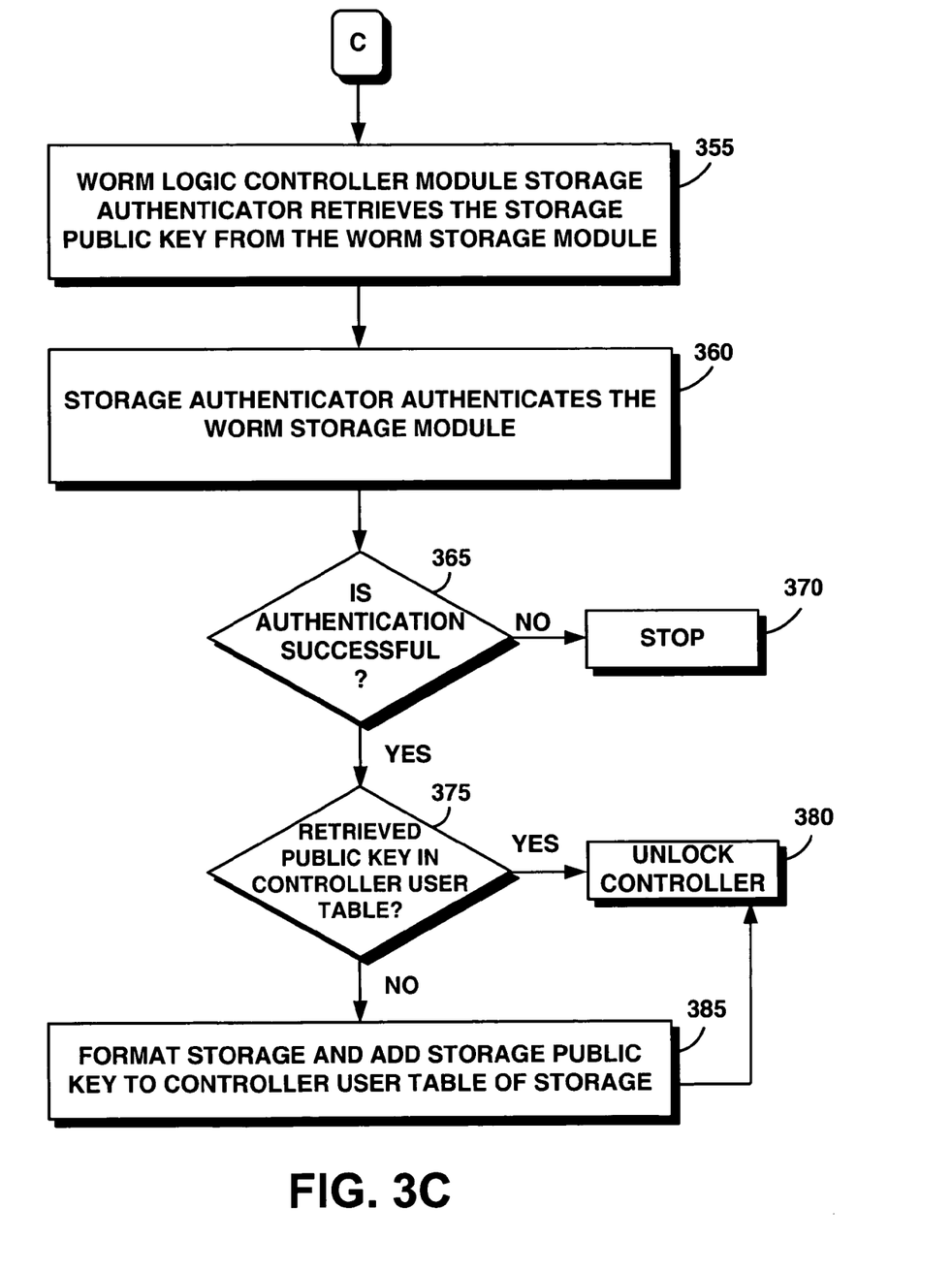

FIG. 3 (FIGS. 3A, 3B, 3C) illustrates a method 300 of the registration and authentication phase of system 10 in which a newly arrived security-enhanced storage enclosure 35 is detected by the WORM logic controller 20. The security-enhanced storage enclosure 35 is connected to the WORM storage system 100 (step 305). The WORM logic controller 20 detects the arrival of the security-enhanced storage enclosure 35 (step 310).

System 10 performs a mutual authentication phase for the WORM storage module 25 and the WORM logic controller 20. The WORM storage module 25 retrieves the controller public key of the WORM logic controller 20 (step 315). The controller authenticator 40 authenticates the WORM logic controller 20 (step 320).

To authenticate the WORM logic controller 20, the controller authenticator 40 encrypts a challenge string with the controller public key of the WORM logic controller 20 and sends the controller public key to the WORM logic controller 20. A genuine, verifiable WORM logic controller 20 is able to decode the encrypted challenge and return the decoded challenge to the controller authenticator 40 as proof. If the controller authenticator 40 cannot authenticate the WORM logic controller 20 (decision step 325), the authentication phase aborts (step 330). Otherwise, the authentication phase continues.

The controller authenticator 40 determines whether the retrieved controller public key is in the storage user table of the WORM storage module 25 (decision step 335). If yes, the WORM storage module 25 unlocks the rewritable media 60 for access by the WORM logic controller 20 (step 340). If the retrieved controller public key is not in the storage user table of the WORM storage module 25 (decision step 345), the WORM logic controller 20 has not registered with the WORM storage module 25.

The WORM storage module 25 determines whether registration criteria have been met (decision step 345). The registration criteria require that the security-enhanced storage enclosure 35 is blank and the registration flag is "open". If the registration criteria are not met, the authentication phase aborts (step 330). Otherwise, the controller authenticator 40 adds the controller public key of the WORM logic controller 20 to the storage user table (step 350).

The security-enhanced storage enclosure 35 may be brand new or partially used. If the security-enhanced storage enclosure 35 is brand new with an empty storage user table, the registration flag of the WORM storage module 25 is in "open" mode. When the registration flag is in "open" mode, the WORM storage module 25 allows addition of any WORM logic controller 20 to the storage user table. Once data is written to the rewritable media 60, the WORM storage module 25 switches the registration flag to "closed" mode and disallows admission of any new WORM logic controllers 80. Any authorized WORM logic controller 20 can set the registration flag.

To provision for fault tolerance and provide a multi-path WORM storage system 100, additional WORM logic controllers 80 can register with the security-enhanced storage enclosure 35 while registration is open. Once the registration is closed, no additional WORM logic controllers 80 can be admitted. This requirement disables registration by malicious controllers intent on tampering with the data in the security-enhanced storage enclosure 35. Consequently, to accommodate potential failure by the WORM logic controller 20, the security-enhanced storage enclosure 35 is over-provisioned with WORM logic controllers 80 before the registration for the security-enhanced storage enclosure 35 is closed. In another embodiment, over-provisioning can be avoided by a certificate-based authentication, as it will be explained below.

To enable flexible capacity scale-up, system 10 allows the security-enhanced storage enclosure 25 to register at any time with the WORM logic controller 20. When the WORM logic controller 20 registers a brand new security-enhanced storage enclosure 35, the WORM logic controller 20 formats and overwrites all the existing data on the rewritable media 60 of the newly registered security-enhanced storage enclosure 35. This formatting procedure avoids polluting data already in the WORM storage system 100 with the data on the newly introduced security-enhanced storage enclosure 35. If the WORM storage module 25 has been previously registered, the WORM logic controller 20 does not format the data on rewritable media 60.

In one embodiment, the WORM logic controller 20 proves a legitimate identity or trustworthiness to enable on-demand registration for the WORM logic controller 20 in which registration is always open for the security-enhanced storage enclosure 35. The registration phase for the storage enclosure is always on, in this embodiment. Hence, no over-provisioning is necessary. To prove the legitimate identity of the WORM logic controller 20, the controller public key and the controller ID are stored in a certificate signed by a trusted manufacturer. The trusted manufacturer encrypts the certificate with the private key of the manufacturer. This certificate cannot be altered since only the manufacturer knows the private key of the manufacturer. The public key of the manufacturer is known to all.

The security-enhanced storage enclosure 35 can verify legitimacy of the WORM logic controller 20 comprising a certificate. The WORM storage module 25 decodes the certificate with the public key of the manufacturer. The controller authenticator 40 authenticates the WORM logic controller 20. A malicious WORM logic controller 20 attempting to replicate the certificate fails authentication because the malicious WORM logic controller 20 does not have the private key that matches the encrypted public key.

Method (or process) 300 continues at step 355 wherein the WORM logic controller module storage authenticator 30 retrieves the storage public key from the WORM storage module 25. The storage authenticator 30 authenticates the WORM storage module 25 (step 360).

At decision step 365, method 300 inquires if such authentication was successful. If it was not, then method 300 terminates at step 370. Otherwise, method 300 proceeds to decision step 375 and inquires if the retrieved public key in found in the controller user table. If it is, the controller is unlocked at step 380. Otherwise, method 300 proceeds to step 385, to format the storage and to add the storage public key to the controller user table of the storage.

Figure 4:
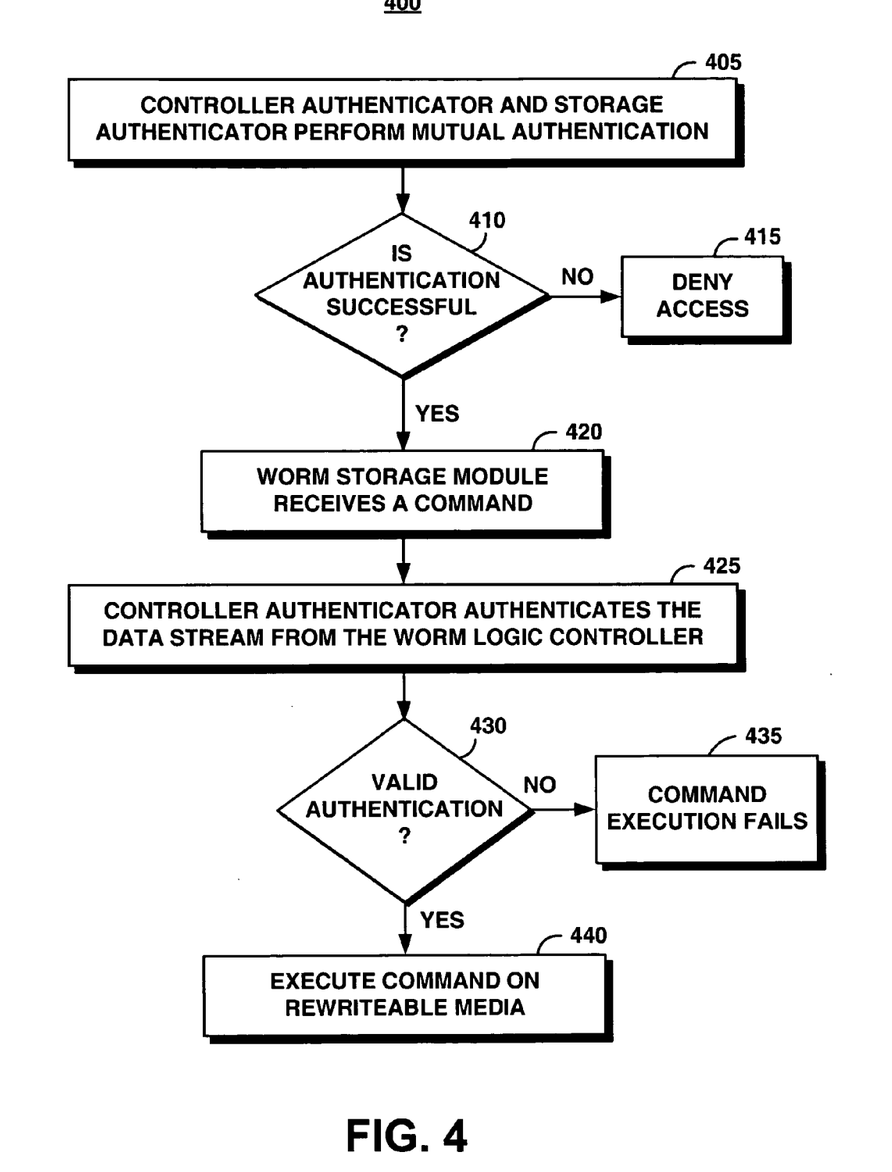
FIG. 4 is a process flow chart illustrating a method of operation of the virtual binding system of FIG. 1 in an operation phase.

FIG. 4 illustrates a method 400 of system 10 in accessing the rewritable media 60 of the security-enhanced storage enclosure 35. The controller authenticator 40 and the storage authenticator 30 perform mutual authentication (step 405), as described by method 300 of FIG. 3. If authentication fails (decision step 410), the WORM storage module 25 denies access to the WORM logic controller 20 (step 415).

If authentication succeeds (decision step 410), the WORM storage module 25 receives a command such as, for example, a write request (step 420). The controller authenticator 40 periodically authenticates the data stream from the WORM logic controller 20 (step 425). If the authentication of the data stream is invalid (decision step 430), the WORM storage module 25 fails the command execution (step 435), and the storage is locked from further access from the command sender. If the authentication of the data stream is valid (decision step 430), the WORM storage module 25 executes the command on the rewritable media 60 (step 440).

Figure 5A:
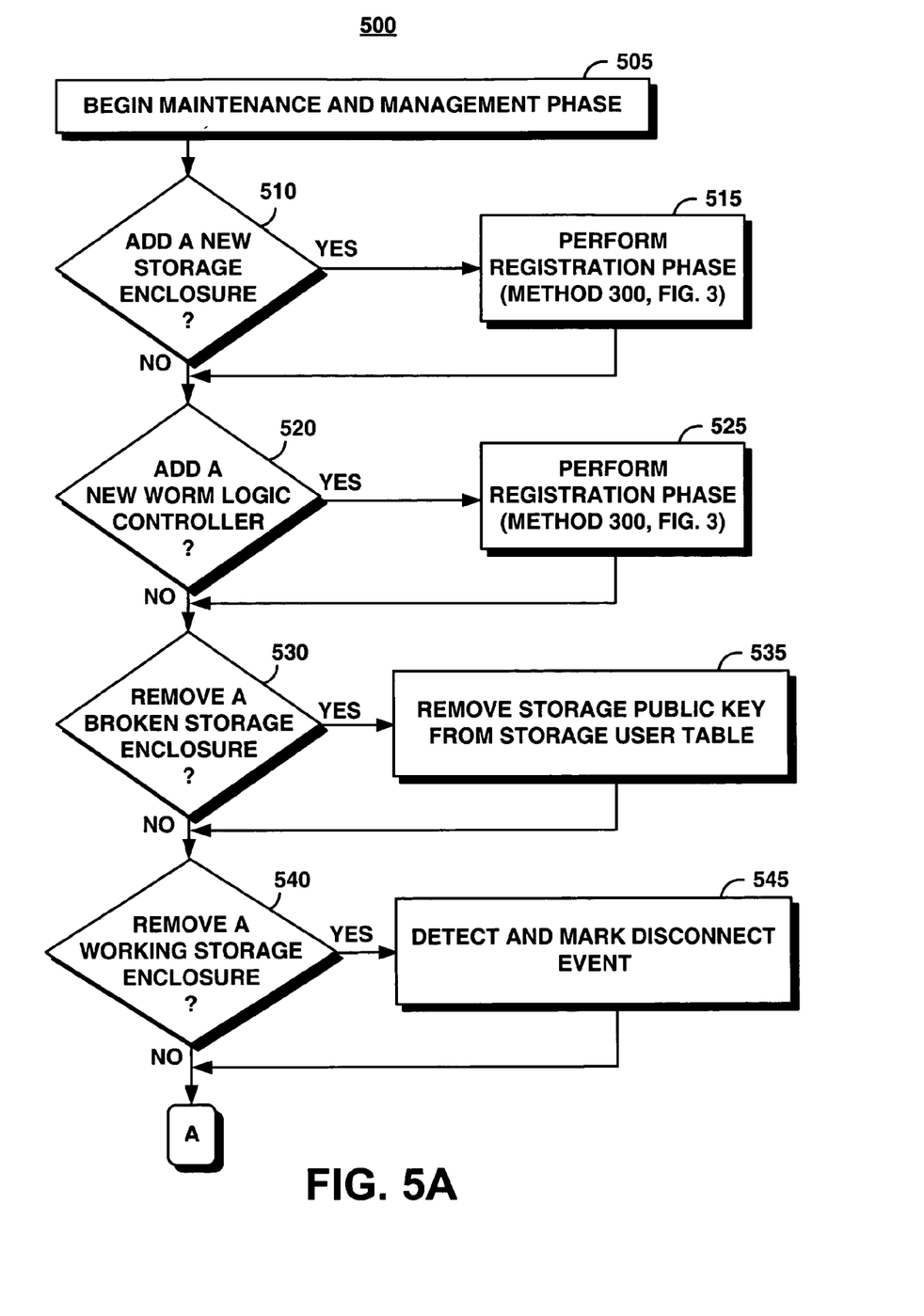
FIG. 5 is comprised of FIGS. 5A and 5B and represents a process flow chart illustrating a method of operation of the virtual binding system of FIG. 1 in a maintenance and management phase.
Figure 5B:
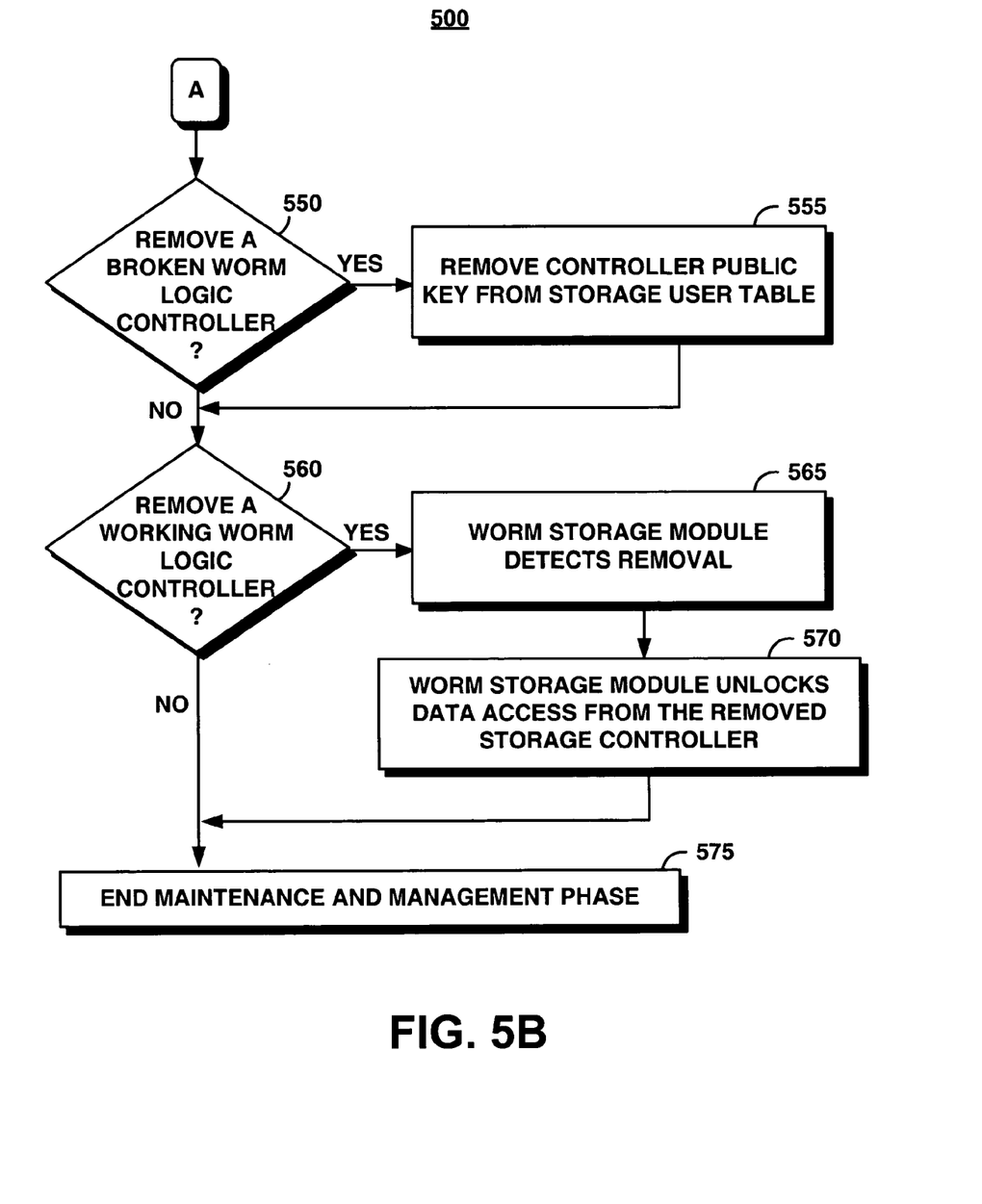

FIG. 5 (FIGS. 5A, 5B) illustrates a method 500 of system 10 in performing the maintenance and management phase. A user begins the maintenance and management phase (step 505). If the user is adding a new security-enhanced storage enclosure 35 (decision step 510), system 10 performs the registration phase of method 300 in FIG. 3 (step 515). If the user is adding a new WORM logic controller 20 (decision step 520), system 10 performs the registration phase of method 300 in FIG. 3 (step 525).

If the user is removing a broken storage enclosure 35 (decision step 530), the WORM logic controller 20 removes the storage public key of the broken security-enhanced storage controller 35 from the controller user table (step 535). A new security-enhanced storage enclosure 35 can be installed in the WORM storage system 100 to replace the broken security-enhanced storage enclosure 35. The new security-enhanced storage enclosure 35 follows the new security-enhanced storage enclosure 35 addition procedure as described in step 510 through 515.

If the user is removing a working storage enclosure 35 (decision step 540), the security-enhanced storage enclosure 35 detects the disconnection of the WORM logic controllers 80 and marks the disconnect event (step 545), and disallows any further access by the WORM logic controllers 80. When the security-enhanced storage enclosure 35 is reinstalled in the WORM storage system 100, system 10 performs the authentication phase as described in method 300 of FIG. 3.

If the user is removing a broken WORM logic controller 20 (decision step 550), the WORM storage module 25 removes the controller public key of the broken WORM logic controller 20 from the storage user table (step 555). When a WORM logic controller 20 fails, a registered sibling WORM logic controller provides data access to the rewritable media 60.

If the user is removing a working WORM logic controller 20 (decision step 560), the WORM storage module 25 detects the removal (step 565) either through notification by system 10 or after a period of idle time by the removed WORM logic controller 20. The WORM storage module 25 unlocks the data access of the rewritable media 60 from the disconnected WORM logic controller 20 (step 570). When the WORM logic controller 20 is reinstalled in the WORM storage system 100, the system 10 performs the authentication phase as described in method 300 of FIG. 3. System 10 ends the maintenance and management phase (step 575).

Figure 6:
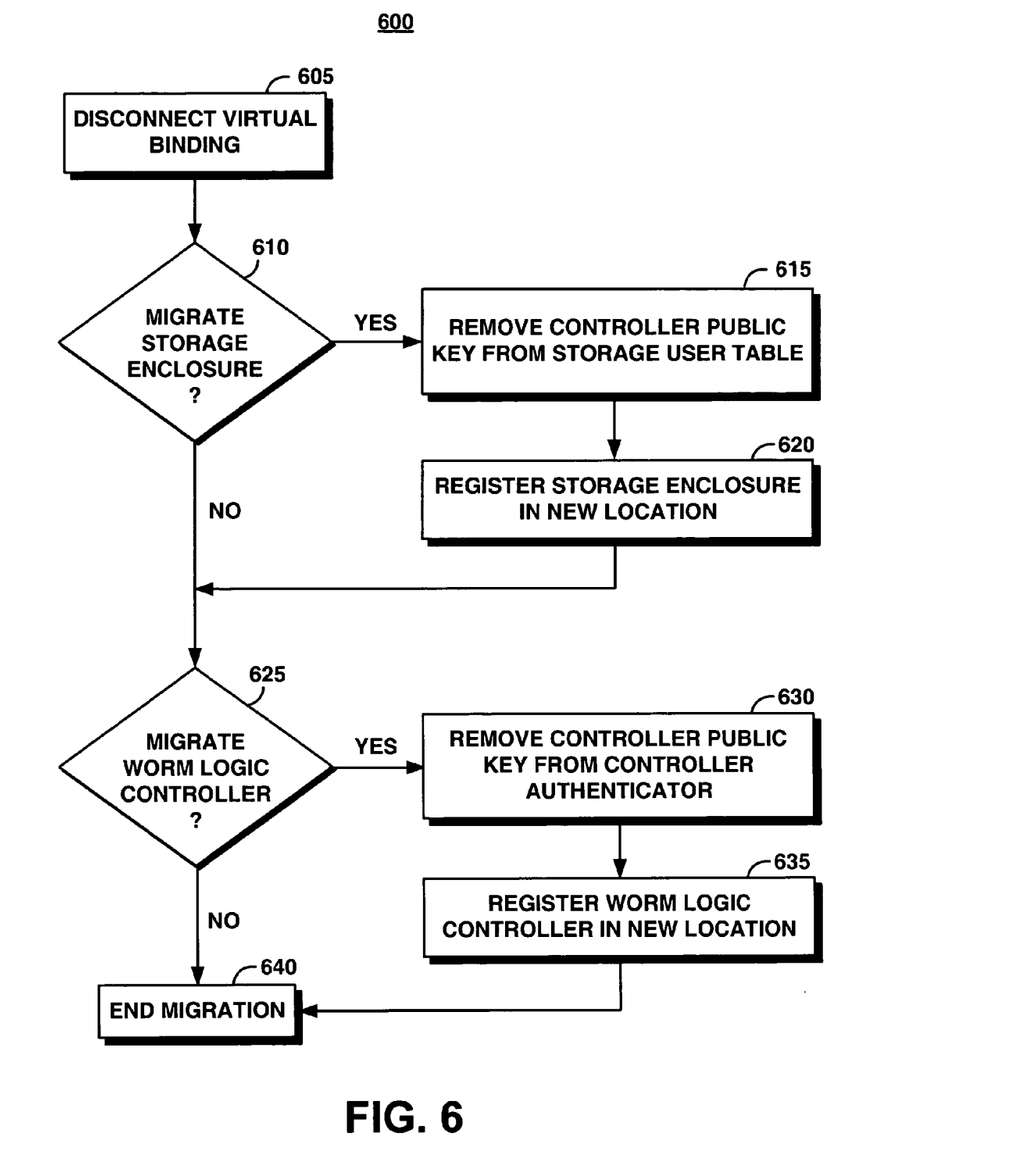
FIG. 6 is a process flow chart illustrating a method of operation of the virtual binding system of FIG. 1 in a migration phase.

FIG. 6 illustrates a method 600 of system 10 in performing a migration phase. System 10 disconnects the virtual binding (step 605). If the user is migrating the security-enhanced storage enclosure 35 (decision step 610), the WORM logic controller 20 removes the controller public key from the storage user table (step 615). System 10 registers the storage enclosure 35 in a "new" location as describe by method 300, FIG. 3. The "new" location may be logically new rather than physically new. Step 615 and 620 apply to the embodiment in which a WORM logic controller 20 has a signed certificate from a trusted manufacturer and registration is always open.

In the embodiment in which registration closes after an initial byte of useful data is written to the security-enhanced storage enclosure 35, a partially written, working security-enhanced storage enclosure 35 can only quit association with one WORM logic controller 20. In this embodiment, the partially written, working security-enhanced storage enclosure 35 cannot admit a new WORM logic controller 20.

If the user is migrating the WORM logic controller 20 (decision step 625), the WORM logic controller 20 notifies the security-enhanced storage enclosure 35. The security-enhanced storage enclosure 35 removes the controller public key from the storage user table (step 630). The WORM logic controller 20 can register with any other security-enhanced storage enclosure 35 in a "new" location (step 635). The "new" location may be logically new rather than physically new. System 10 ends the migration phase (step 640).

It is to be understood that the specific embodiments of the invention that have been described are merely illustrative of certain applications of the principle of the present invention. Numerous modifications may be made to the system and method for providing a virtual binding for a WORM storage system on rewritable media described herein without departing from the spirit and scope of the present invention.

What is claimed is:

1. A system configured to provide a virtual binding for a write once read many (WORM) storage system on a rewritable medium, comprising:
   a WORM logic controller and a WORM storage module of a security-enhanced storage enclosure;
   the WORM storage module being configured to register the WORM logic controller on the WORM storage module;
   a controller authenticator configured to authenticate the WORM logic controller using a public key;
   a storage authenticator configured to authenticate the WORM storage module,
   wherein the security-enhanced storage enclosure is configured to migrate by removing the public key from a storage user table and registering the security-enhanced storage enclosure at a new location, and the WORM logic controller is configured to migrate by removing the public key from the controller authenticator and registering the WORM logic controller at a new location,
   wherein the WORM logic controller and the WORM storage module are configured to execute a command on the rewriteable medium in a secure manner.

* * * * *